C. De Saxe,
Fishing Rod.

Nº 10,795.   Patented Apr. 18, 1854.

Witnesses:

Inventor:
Charles De Saxe

UNITED STATES PATENT OFFICE.

CHARLES DE SAXE, OF NEW YORK, N. Y., ASSIGNOR TO THOMAS H. BATE.

IMPROVEMENT IN FISHING RODS AND FLOATS.

Specification forming part of Letters Patent No. 10,795, dated April 18, 1854.

*To all whom it may concern:*

Be it known that I, CHARLES DE SAXE, of the city and county and State of New York, have invented certain new and useful Improvements in Fishing-Tackle—in the Construction of Fishing Rods and Floats; and I do hereby declare that the following is a full and exact description thereof, reference being had to the accompanying drawings, and to the letters of reference marked thereon.

Figure 1:
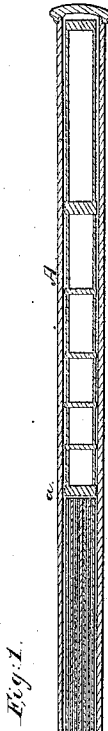
Figure 2:
Figure 4:
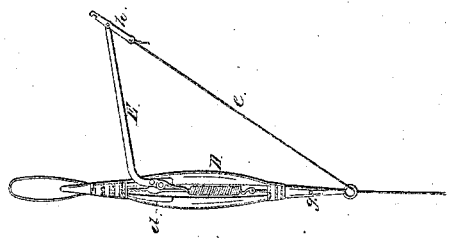
Figure 3:
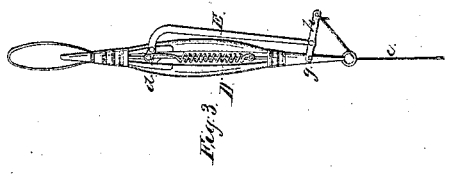

Figure 1 is drawn half-size, and Figs. 2, 3, and 4 full size, of model.

The nature of my invention consists in inserting in and combining with the rod a secure and convenient safe or box for carrying the various implements of fishing-tackle, and in so constructing my float that the slightest bite or nibble will cause the hook to suddenly spring upward and secure the fish.

To enable others to make and use my invention, I will describe its construction and operation.

I construct my rod after the usual manner of walking-rods, the different lengths or joints sliding within each other. The butt-joint, or the one which is to contain the others, I make ten or twelve inches longer than the other joints, so that there will be a cavity of that length in the largest end of the butt-joint when the rod is put together. This cavity is represented in Fig. 1 at A, the ends of the other lengths or joints being shown at $a$. Of the same length of this cavity, and to fit within it, I make a circular box or tackle-safe, (represented in Fig. 2,) divided into a number of separate compartments, one of which is large enough to hold a float with a line ready for use, and the others of suitable size to hold hooks, hackles, swivels, and the other implements of the art, and all these are kept in their proper places and are prevented from falling out by means of the slide $b$, passing under the bands $c\ c\ c$, or by a door shutting over the top.

The float (shown in Figs. 3 and 4) I construct as follows: In one side of it and toward the end, I make a cavity, in which I place a helical spring, D, coiled around a small iron standard, $d$. One end of this spring is fastened to the lower end of the standard $d$, and the other end is attached to the short arm of the lever E, this lever resting and moving in the upper end of the standard $d$, and having attached to its longer arm the hook and line $e$. Near the end of the float is a little catch or pin, $g$, to which the hook $h$ is fastened when the lever E is sprung down, which is done when the line and its float are intended to be used. This hook $h$ may be set on the catch $g$ so that the slightest touch at the end of the line will disengage it and spring the lever, or so that it will resist considerable interference, the variation being according to the nature of the fish to be angled for. As soon as the hook $h$ is detached from the catch $g$ the helical spring D acts upon the short arm of the lever E and throws up the long arm, and thus hooks the fish.

I am aware that fishing-rods have been often constructed so that the different pieces or lengths should slide within each other, and I am also aware that these various pieces have been made of different lengths, the largest one being the longest, so that there would be a space in the largest not occupied by the other lengths; but, so far as I have been able to learn, this space has never been rendered useful by converting it into a safe and convenient receptacle for carrying the various implements and contrivances belonging to the angler's art, such as hooks, hackles, leads, swivels, &c.

I do not claim the peculiar construction of the rod; but

I do claim as my invention and desire to secure by Letters Patent—

1. The combination of the tackle-safe, Fig. 2, with the rod, substantially as before set forth, and so that the whole combination forms but a single article, compact, safe, and convenient.

2. The peculiar construction of the float E, as substantially before set forth, by which the slightest touch at or interference with the hook causes the line to be suddenly moved or jerked, as if by a quick motion of the hand, and the fish to be thereby hooked, and whether the float is used with the combination before set forth or separately therefrom.

CHARLES DE SAXE.

In presence of—
    M. V. B. WILCOXSON,
    S. D. LAW.